United States Patent [19]

Kowalski

[11] Patent Number: 4,579,315

[45] Date of Patent: Apr. 1, 1986

[54] VALVE FOR FIRE SUPPRESSION

[75] Inventor: Slawomir Kowalski, Oak Ridge, N.J.

[73] Assignee: Marotta Scientific Controls, Inc., Boonton, N.J.

[21] Appl. No.: 692,713

[22] Filed: Jan. 18, 1985

Related U.S. Application Data

[63] Continuation-in-part of Ser. No. 446,499, Dec. 3, 1982, abandoned.

[51] Int. Cl.[4] .............................................. F16K 31/44

[52] U.S. Cl. ........................................ 251/67; 251/68; 137/624.27

[58] Field of Search ...................... 251/67, 68, 138, 66; 169/19, DIG. 3; 251/254, 263, 297, 76, 73, 74, 72; 137/624.27

[56] References Cited

U.S. PATENT DOCUMENTS 3,089,507 5/1963 Drake et al. .......................... 251/68

3,273,588 9/1966 Dollison .............................. 251/297

4,280,561 7/1981 Fredd .................................. 251/297

4,289,039 9/1981 Trunner et al. .................. 251/68 X

FOREIGN PATENT DOCUMENTS 3036140 7/1981 Fed. Rep. of Germany ........ 169/19

*Primary Examiner*—Larry Jones

*Attorney, Agent, or Firm*—Hopgood, Calimafde, Kalil, Blaustein & Judlowe

[57] ABSTRACT

The invention contemplates a quick-opening valve for release of pressurized gas to suppress a hydrocarbon or the like fire and/or explosion. A piston or poppet-valve member is retained by mechanical-latch mechanism in its readiness condition, normally closing off pressurized liquified suppressant gas against release for fast discharge via a discharge port. Latch release is via short low-friction, low-inertia direct action which is independent of the pressure differential across the valve member.

14 Claims, 8 Drawing Figures

VALVE FOR FIRE SUPPRESSION

RELATED CASE

This application is a continuation-in-part of application Ser. No. 446,499, filed Dec. 3, 1982, now abandoned.

BACKGROUND OF THE INVENTION

The invention relates to quick-opening valve mechanism for release of pressurized gas to suppress a fast-developing fire or explosion, as from ignition of a hydrocarbon or the like fuel.

The inner volume of a military tank is illustrative of an environment that is prone to disastrous consequences in the event of a hydrocarbon fire, as when a fuel tank has been ruptured by an armor-piercing shell. Detector devices exist with capability of generating an electrical-signal output at onset of fire, and the means exists for liquified storage of suppressant gas under pressure, for discharge to suppress the fire in response to the detector signal output. However, valve mechanism for responding to the detector signal and for releasing the suppressant gas has been far from reliable, to the extent that the release of suppressant gas may or may not be in time to avert disastrous consequences.

It is believed that one reason for unreliability of such present valve mechanisms is that controlled operation of the valve member from normally closed to full-open position has relied upon pressure-responsive means including one or more pilot-operated stages, for example, a solenoid-operated pilot valve, which releases pressure fluid to control valve-member displacement. Such arrangements involve displacements, multiple seals, and mechanical friction which make it difficult, if not impossible, to obtain consistent performance, as to speed of valve opening, and as to time delay until valve opening, for a given valve, and from one to the next valve in a given production lot.

Other devices have sought entirely to eliminate valve action, by employing a frangible diaphragm to maintain normal closure of a pressurized suppressant gas supply, with release and discharge by reason of an explosive cap which is fired to break the diaphragm. But such devices are difficult to clean, for recharge purposes, and they are not safe, in that they may be accidentally operated in the event of nearby radio transmissions.

BRIEF DESCRIPTION OF THE INVENTION

It is an object of the invention to provide an improved valve of the character indicated, providing consistent high-speed response to triggering action.

It is a specific object to achieve the above object without reliance on pressure-operated means, other than the continuously operative pressure of the associated charge of liquified suppressant gas.

Another specific object is to achieve the above objects with simple direct-acting mechanical structure of inherently low inertia, short displacement, and low friction throughout its short displacement.

A further specific object is to meet the above objects with triggering action that is responsive to the electrical-output signal of a detector device.

The invention achieves these objects in a valve construction in which a piston or poppet-valve member is retained by mechanical-latch mechanism in its readiness condition, normally closing off pressurized liquified suppressant gas against release for fast discharge via a discharge port. Latch action and latch release are both symmetrical about the valve-displacement axis, and latch release is via short-displacement, low-friction, low-inertia direct action which is independent of the pressure differential across the valve member. In one embodiment, electrical response to the detector-output signal is via a solenoid on the valve-displacement axis, and in another embodiment electrical response is via an explosive squib on the valve-displacement axis. In both cases, the construction optionally provides for manual operation of the latch-release mechanism.

DETAILED DESCRIPTION

The invention will be illustrative described in detail in conjunction with the accompanying drawings, in which.

Figure 1:
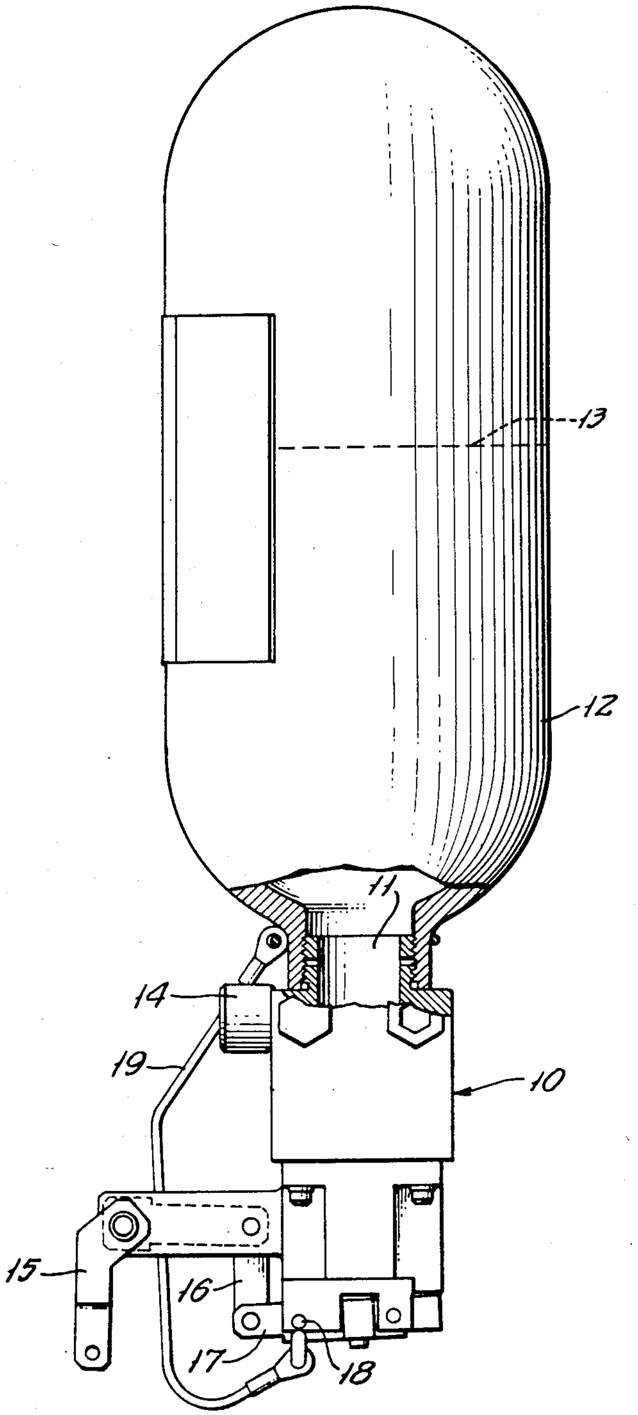
FIG. 1 is a simplified view in elevation of a fire-suppressing valve of the invention, in assembled relation to a charge bottle for containment of liquified-suppressant gas under pressure.

Referring initially to FIG. 1, the invention is shown in application to a valve 10 having an upwardly projecting threaded inlet-port formation 11 via which a bottle 12 is mounted, in inverted condition, in readiness for rapid discharge (via an outlet port, not visible in FIG. 1) of pressurized liquified suppressant gas. Illustratively, the suppressant-liquid contents will be to a level suggested at 13, and the liquid may be a freon-based Dupont product known as Halon 1301. This suppressant is stored as a liquid, under pressure of a propellant gas such as nitrogen, and it rapidly proceeds to its gaseous state, upon discharge. A gauge 14 is externally viewable, to indicate the pressurized state of bottle contents. As will be explained below, the valve 10 is solenoid-actuated for discharge of bottle contents. And manual-override mechanism, including a bellcrank 15, link 16 and crank 17, is available for optional discharge of bottle 12. A removable lock-out pin 18 prevents inadvertent actuation of crank 17, and pin 18 is shown with flexible cable connection 19 to described structure, to avoid loss of pin 18, once it is removed from locking relation to crank 17.

Referring now to FIGS. 2 to 5, the valve of FIG. 1 is seen to comprise a body 21 having an elongate bore on a vertical axis 22, upon which inlet 11 is centered. The bore is characterized by an enlarged generally central chamber cavity 23 which communicates laterally with a large discharge port 24 of oval section. Between inlet 11 and cavity 23, a smooth cylindrical land 25 receives and supports a cylindrical piston-valve member or poppet 26, and separate elastomeric O-rings in two spaced circumferential grooves of valve member 26 establish redundant sealing of pressurized suppressant fluid from chamber 23 when member 26 is in its normally closed upper position, as shown. Beneath chamber 23, the bore on axis 22 is counterbored to provide locating shoulders for a flanged bushing 27 and for the flanged base of an annular snubber 28 of elastomeric material. The annular base ring of a collet 29 locates at a shoulder in bushing 27 and provides radial-piloting support for an elongate cylindrical surface of a valve-member stem 30, shown integrally formed with valve member 26 and longitudinally bored to minimize inertial lag in the pressure-response of valve member 26.

Body 21 is effectively extended by a cupped end-housing member 31, bolted thereto and defining a cavity for containment and coaxial location of a solenoid winding 32 and a generally toroidal core associated therewith. This core is of magnetic flux-conducting material of high permeability; the core is seen to comprise inner and outer concentric annular legs 33–34 integrally connected by an upper radially extending annular leg 35 and concentrically fitted at 36 to a counterbore in the bottom face of body 21. The toroidal flux path of the solenoid is completed via short air gaps between lower ends of legs 33–34 and an annular armature plate 37, which derives axially slidable support from a sleeve-like armature stem 38, piloting on the cylindrical bore of the inner core leg 33. The reduced lower end of stem 30 pilots on a central bore 39 in the bottom-closure wall of end housing 31.

Figure 2:
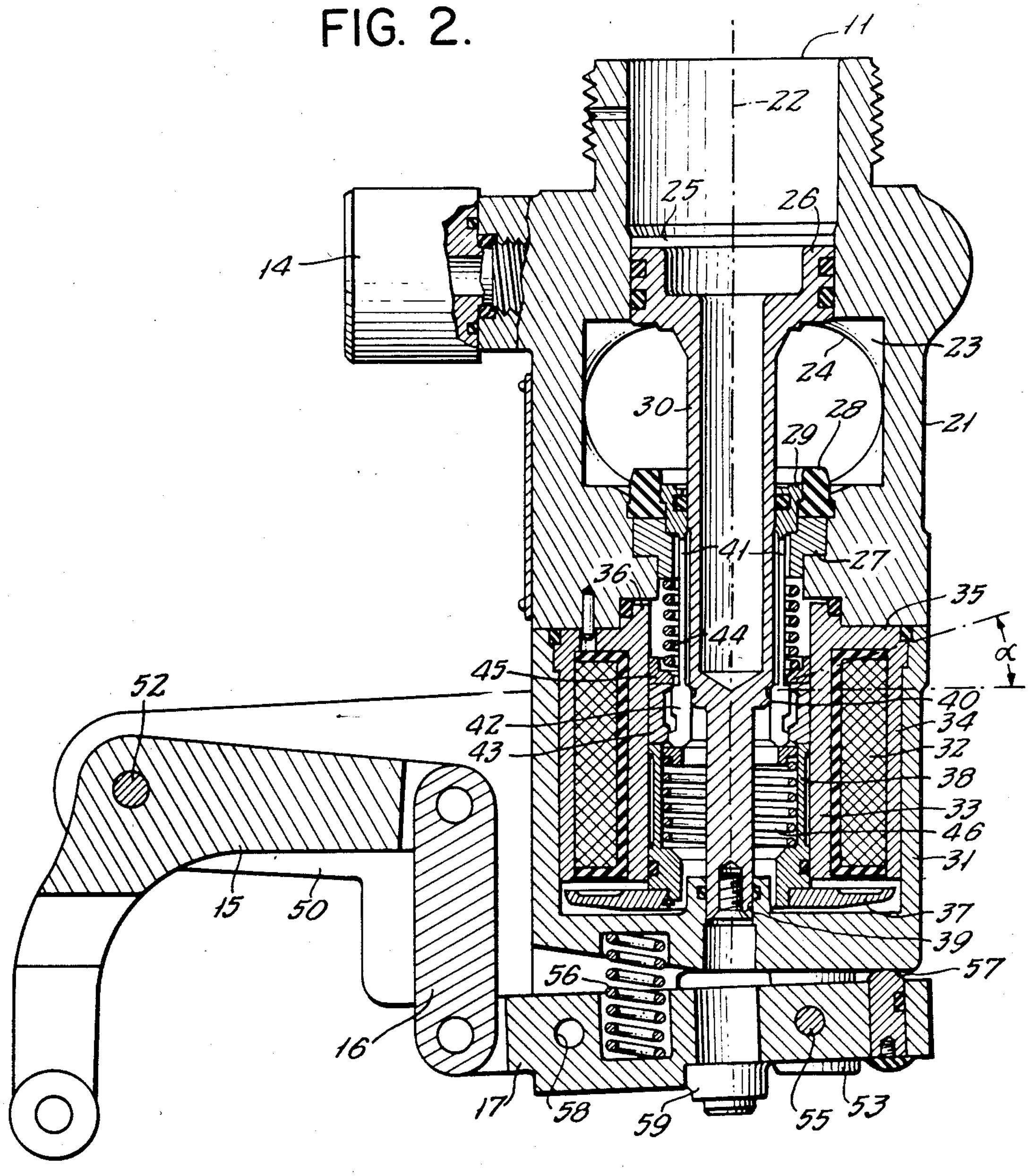
FIG. 2 is an enlarged vertical sectional view through the valve of FIG. 1.

To retain the mechanically latched valve-closed position shown in FIG. 2, stem 30 is locally reduced at 40 to defined a radially short but circumferentially continuous shoulder, having preferably a slope $\alpha$ in the order of 10° to a strictly radial plane, for cam purposes which will become clear; and collet 29 is characterized by an angularly distributed plurality of elongate collet fingers 41. Each collect finger 41 has an enlarged lower end 41 which will be understood to be radially displaceable by reason of compliant flexibility along the length of each finger 41. Inner contouring of each collet end 42 is characterized by a heel of slope $\alpha$ and engaged to the stem shoulder (adjacent reduction 40) when the collet end 42 is radially inwardly confined. A short sleeve 43, which is slidable on the bore of inner core leg 33, is shown positioned to provided such confinement, thereby preventing high pressure on the upstream side of valve member 26 from driving member 26 out of the normally closed position shown. A first coil spring 44, compressed between bushing 27 and a slidable ring 45 is retained in compressed condition by ring (45) abutment with radially outward shoulder portions of all collet ends 42; and sleeve 43 is poised for axially upward driving abutment with ring 45, relieving the same from shoulder abutment with collet ends 42, upon solenoid actuation. A second coil spring 46 is compressed between a shoulder of armature stem 38 and the lower finger ends of the collet, to assure against inadvertent opening of the valve in response to mechanical shock.

Figure 3:
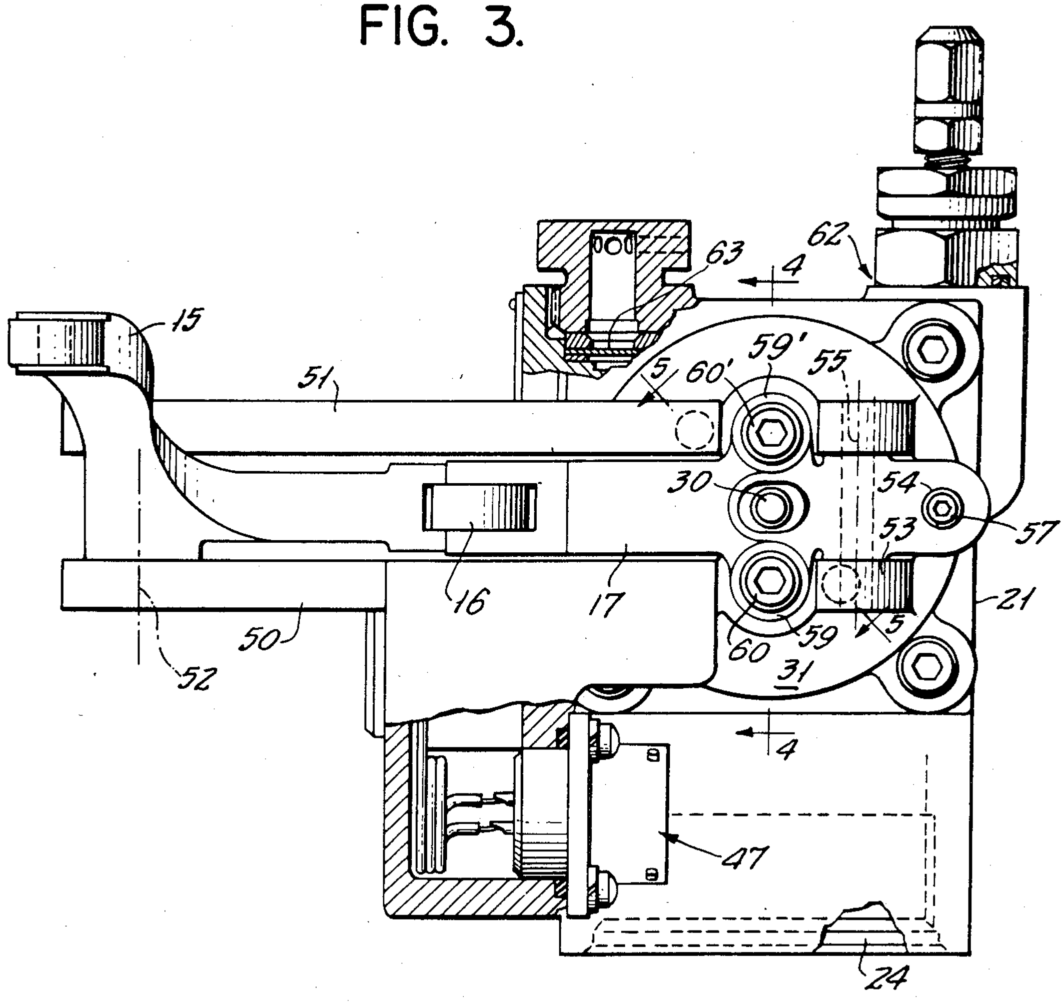
FIG. 3 is a bottom view, as seen beneath the view of FIG. 2.

Solenoid actuation will be understood to involve excitation of winding 32 upon development of an output signal by an explosion detector, not shown in detail but here suggested at 47 to one side of the exhaust port 24 (FIG. 3). Solenoid winding excitation causes armature plate 37 to close gaps to core legs 33–34, thus driving sleeve stem 38 to upwardly displace sleeve 43 with respect to collet ends 42. By reason of this displacement, upper and lower lands in the bore of sleeve 43 are no longer positioned to retain collet ends 42 in radially inward confinement, so that collet ends 42 may radially outwardly shift in quick response to axially downward gas-pressurized force on valve member 26 (aided by outward cam action via the engaged slopes $\alpha$), thus freeing valve member 26 for gas-powered descent and impact with snubber 28. The valve is immediately opened and depressant gas discharged laterally via port 24.

Figure 4:
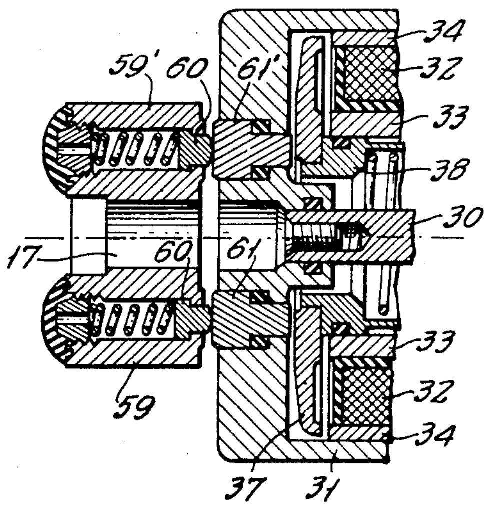
FIGS. 4 and 5 are sectional views, respectively taken at 4—4 and 5—5 of FIG. 3.
Figure 5:
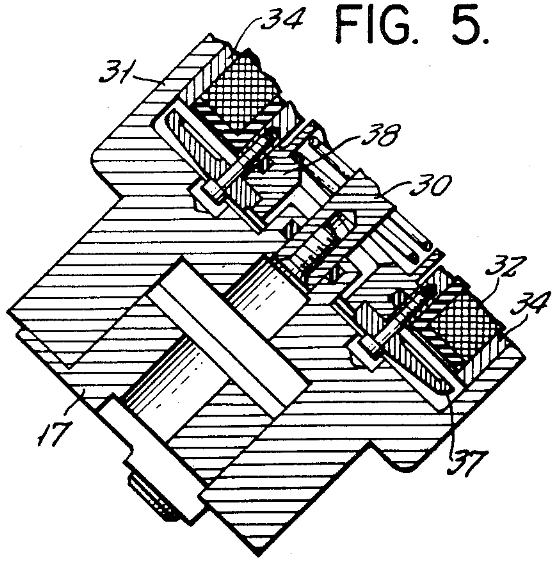

It has been generally indicated that external mechanism 15-16-17 provides a manually or otherwise actuated release of the latch action between sleeve 43 and collet ends 42. More specifically, end housing 31 is shown to integrally include side arms 50–51 for pinned support (at 52) of bellcrank 15 therebetween, as well as integral lugs or trunions 53–54 for pinned support (at 55) of crank 17 therebetween. A compressed spring 56 constantly urges crank 17 to the position shown in FIG. 2, the same being limited by a tail stop 57 on crank 17. A transverse hole 58 in crank 17, laterally outward of spring 56, provides access for reception of the locking pin 18 described in connection with FIG. 1. In FIGS. 3 and 4, crank 17 is seen to have diametrically opposite lugs 59—59' (i.e., diametrically opposed with respect to axis 22 of valve action and symmetry. Preloaded pin means 60—60' carried by the respective lugs 59—59' align with flanged slide pins 61—61' in guide bores of housing 31, for symmetrical upward application of displacement force to armature plate 37, thereby enabling direct release of the latched relation at 42–43. By selection of suitable resilient action in O-rings seated beneath flanges of pins 61—61', pins 61—61' are normally poised in slight clearance relation with armature plate 37, as can be seen in FIG. 4.

To complete the description of the valve of FIGS. 2 to 5, suitable fittings include a fill valve at 62 to enable refilling and recharging of bottle 12. Also, a safety blow-out disc 63 is fitted to body 21 and will be understood to be exposed to pressure within the inlet region 11 upstream from the closed position of valve member 26.

Figure 6:
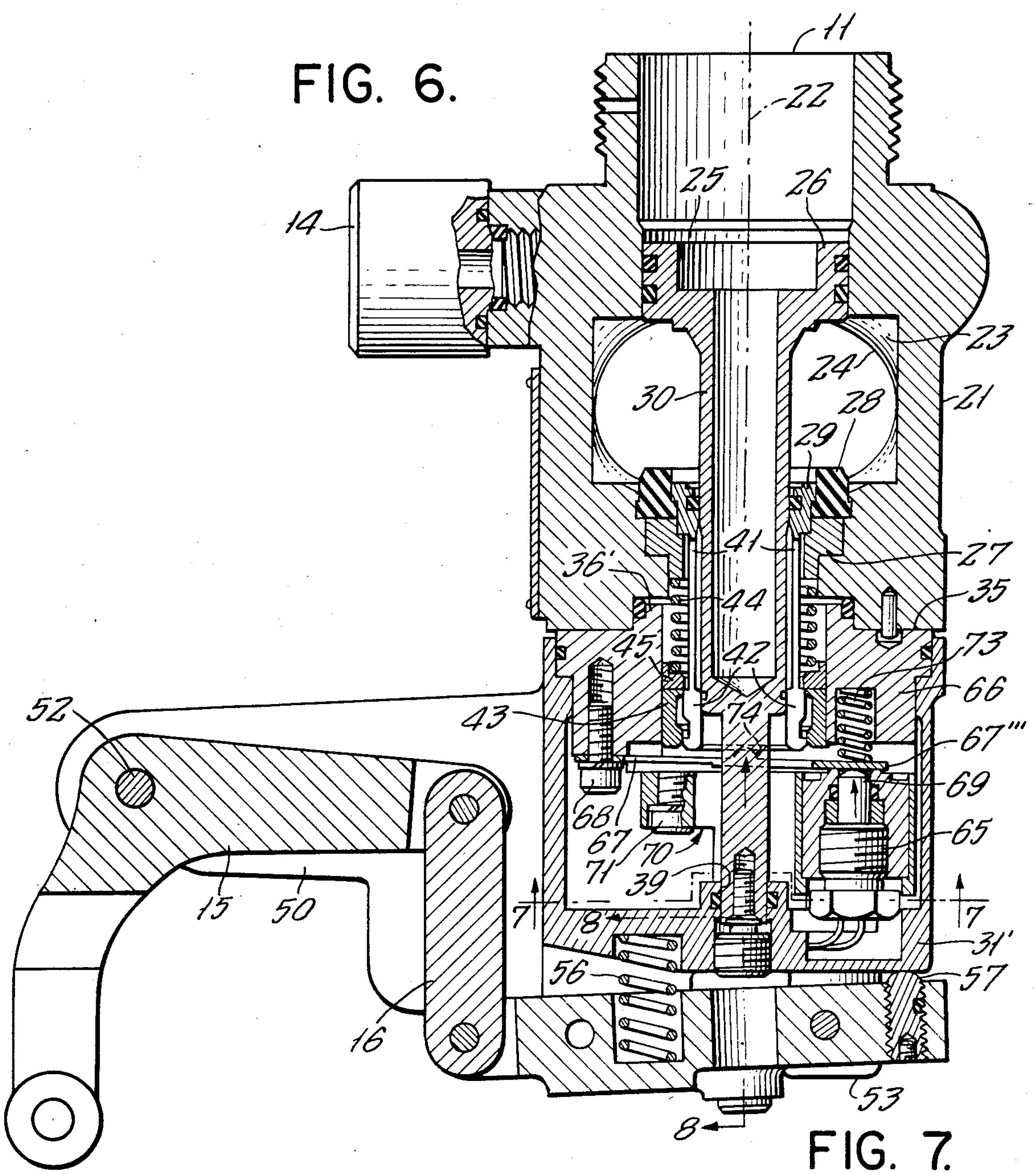
FIG. 6 is a view similar to FIG. 2, to show another embodiment.

FIG. 6 illustrates another embodiment wherein an electrically ignited explosive squib 65 provides the direct actuation for release of mechanical latch mechanism which embodies twin-land radial restraint of collet fingers, in the manner described for the form of FIGS. 1 to 5, i.e., when locking the valve member or poppet 26 in its normally closed position. In FIG. 6, some of the parts are as described in connection with FIGS. 2 to 5 and have therefore been given the same reference numbers.

Briefly, an annular base member 66 is bolted to body 21 and has a reduced end 36' which locates in the lower counterbore of body 21. Annular member 66 has a cylindrical bore which provides piloting support for the collet-locking sleeve 43 and for ring 45, preloaded by spring 44. The cupped end-housing member 31' encloses all latch mechanism (including squib 65) and also establishes the mounting formations (50–53) for manually operative latch-release mechanism 15-16-17; additionally, a central guide bore in the closed end of member 31' establishes accurate slidable alignment for the reduced lower end of valve stem 30.

Figure 7:
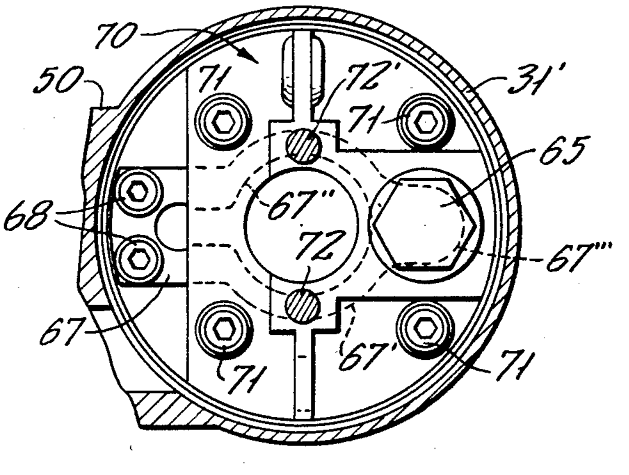
FIGS. 7 and 8 are fragmentary sectional views, respectively taken at 7—7 and at 8—8 in FIG. 6.
Figure 8:
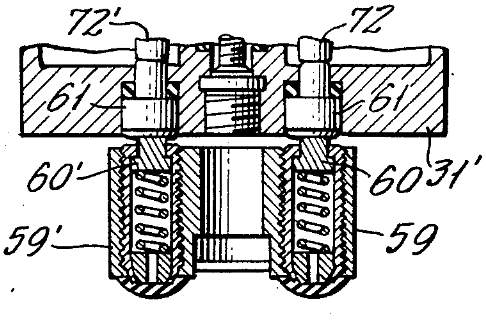

Within end-housing member 31', one end of a leaf spring 67 is bolted at 68 to annular member 66; it is of outwardly bowed and centrally open contour best seen at dashed outlines 67'—67" in FIG. 7, being cantilevered in its substantially diametral span of member 66, with its cantilevered end 67''' being poised for actuation by a plunger 69, upon squib (65) firing. A mounting member 70 is contoured at its upper end to straddle and and to clear the leaf spring 67 but otherwise to seat upon the lower end face of annular member 66, so that bolts 71 may secure both mounting member 70 and annular member 66 to body 21. A downward pedestal formation of member 70 establishes a threaded bore for acceptance of squib 65 and a guide bore for plunger 69, as well as diametrically opposite guide bores for actuator pins 72 (aligned with the respective bowed regions of the leaf spring 67) for transmitting manual-trip motion of bell-crank 15 to the latch-retaining sleeve 43. In normal, latched readiness for either a manually tripped shift of sleeve 43 or a squib-actuated shift of sleeve 43, a spring 73 biases the cantilevered end of the leaf spring into continuously loaded engagement with plunger 69 for the condition that local diametrically opposite rib formations 74 in the bowed regions 67' lightly but positively engage diametrically opposed locations at the lower end of sleeve 43. Finally, as can be seen from thickness variations in FIG. 6, the leaf spring 67 preferably is of greater thickness (and therefore more stiffly compliant) in its outer cantilevered region, which comprehends rib formations 74 and extends to outer end 67''', while the remainder of leaf spring 67 is of less thickness (and therefore less stiffly compliant).

As in the case of FIGS. 1 to 5, the only latch-releasing upward displacement required of sleeve 43 in FIG. 6 is that very short axial distance which is involved in shifting the upper and lower cylindrical lands (in the bore of sleeve 43) from their respective radially interfering relationships with corresponding convex cylindrical features of the collet fingers 42. In view of the very short axial displacement involved, and in view of the inherently low-friction nature of the cylindrical-to-cylindrical radial restraint provided by sleeve 43 when in latch-retaining position, the release of a latched engagement is fast and reliable whether due to electrical initiation, via solenoid excitation (FIGS. 2 to 5) or via squib-excitation (FIG. 6), or due to manual operation of the described lever system.

The disclosed embodiment of the invention will be seen to meet all stated objects. It is the pressurized-gas charge which alone opens the main valve. The latch to retain the main valve in closed position is purely mechanical and it is symmetrically applied about the axis of the valve. Further, the release of latch action is a direct mechanical action, again operative with symmetry about the valve axis, and this is so whether latch release is electrically or mechanically triggered. Finally, the main valve and its stem are well guarded against the side thrust of valve discharge, so that stem and valve action are free and perform with repeated reliability.

While the invention has been described for preferred embodiments, it will be understood that modifications may be made without departing from the scope of the invention.

What is claimed is:

1. A quick-opening valve for release of gas to suppress a hydrocarbon or the like fire, comprising an elongate body with a central bore characterized by a chamber cavity and a cylindrical valve-member land at an upstream end, a discharge port communicating with the chamber cavity, a cylindrical valve member deriving resiliently sealed support from said land, an inlet port at said upstream end in communication with said bore at said land and adapted for removable attachment of a pressure-charged container of liquified suppressant gas, with the gas continuously loading said valve member for displacement from a first position of closure engagement with said land to a second position in axial offset from said land, means including a stem for providing valve-member support on the axis of said bore throughout valve-member displacement from one to the other of said positions, mechanical-latch means positively retaining said valve member and stem against pressure-loaded displacement from said first position, said latch means comprising a collet with fingers providing body-referenced restraint against such displacement at angularly spaced locations symmetrical about the axis of said bore, and electrically responsive latch-release means including an axially shiftable cylindrical actuating sleeve element surrounding said fingers and guided by the axis of said bore and simultaneously operable to release said latch means at all said angularly spaced positions, said sleeve element having a bore characterized by two axially spaced radially inwardly projecting cylindrical lands, and said fingers being characterized by two axially spaced radially outwardly projecting feet which radially abut said lands in the engaged condition of said latch means, said latch means being released upon sleeve displacement of said lands axially away from foot-to-land radial-abutting relation.

2. The valve of claim 1, in which said collet has an annular base end surrounding said stem and clamped to said body, said stem being characterized by a circumferentially continuous shoulder in axial register with said collet fingers when said valve member is in said first position, said collet fingers each having a heel engaged to said shoulder when said fingers are radially inwardly retained by said lands.

3. The valve of claim 2, in which said shoulder-to-heel engagement is via coacting sloped surfaces at an acute angle to the valve axis, the direction of inclination being to radially outwardly cam said fingers in response to gas pressure on the inlet side of said valve member.

4. The valve of claim 1, in which said latch-release means includes a solenoid mounted to said body in coaxial relation to said axis for operation of said actuating sleeve element.

5. The valve of claim 4, in which said latch-release means further comprises manually operable mechanical means for operation of said actuating sleeve element.

6. The valve of claim 1, in which said latch-release means includes an explosive squib mounted to said body for operation of said actuating sleeve element.

7. The valve of claim 5, in which said latch-release means further comprises manually operable mechanical means for operation of said actuating sleeve element.

8. The valve of claim 1, in which said valve member is a piston having a circumferentially continuous annular abutment surface near its outer diameter, an annular snubber ring of elastomeric material concentrically seated in said body on the bore axis and presenting an annular snubber abutment surface ot the abutment surface of said piston.

9. The valve of claim 1, in which the axial spacing of said lands is at least as great as the axial extent of the feet which are displaceable into the space between lands for a release from latched retention of said first valve-member position.

10. A quick-acting valve having a body and a valve member and stem movably guided by a bore of said body between valve-open and valve-closed positions, loading means carried by said body and continuously loading said valve member and stem in the direction from one to the other of said positions, and mechanical-latch means positively retaining said valve member and stem in said one position and against loaded displacement to said other position, said latch means comprising a collet with fingers providing body-referenced restraint against such displacement at angularly spaced locations symmetrical about the axis of said bore, and electrically responsive latch-release means including an axially shiftable cylindrical actuating sleeve element surrounding said fingers and guided by the axis of said bore and simultaneously operable to release said latch means at all said angularly spaced positions, said sleeve element having a bore characterized by two axially spaced radially inwardly projecting cylindrical lands, and said fingers being characterized by two axially spaced radially outwardly projecting feet which radially abut said lands in the engaged condition of said latch means, said latch means being released upon sleeve displacement of said lands axially away from foot-to-land radial-abutting relation.

11. A quick-opening valve for release of gas to suppress a hydrocarbon or the like fire, comprising an elongate body with a central bore characterized by a chamber cavity and a cylindrical valve-member land at an upstream end, a discharge port communicating with the chamber cavity, a cylindrical valve member deriving resiliently sealed support from said land, an inlet port at said upstream end in communication with said bore at said land and adapted for removable attachment of a pressure-charged container of liquified suppressant gas, with the gas continuously loading said valve member for displacement from a first position of closure engagement with said land to a second position in axial offset from said land, means including a stem for providing valve-member support on the axis of said bore throughout valve-member displacement from one to the other of said positions, mechanical-latch means positively retaining said valve member and stem against pressure-loaded displacement from said first position, said latch means comprising a collet with fingers providing body-referenced restraint against such displacement at angularly spaced locations symmetrical about the axis of said bore, and latch-release means including an axially shiftable cylindrical actuating sleeve element surrounding said fingers and guided by the axis of said bore and simultaneously operable to release said latch means at all said angularly spaced positions, said sleeve element having a bore characterized by two axially spaced radially inwardly projecting cylindrical lands, and said fingers being characterized by two axially spaced radially outwardly projecting feet which radially abut said lands in the engaged condition of said latch means, said latch means being released upon sleeve displacement of said lands axially away from foot-to-land radial-abutting relation.

12. The valve of claim 11, in which said latch-release means comprises manually operable mechanical means for operation of said actuating sleeve element.

13. The valve of claim 11, in which said latch-release means comprises a solenoid mounted to said body for imparting an axial shift to said actuating sleeve element.

14. The valve of claim 11, in which said latch-release means comprises a squib mounted to said body for imparting an axial shift to said actuating sleeve element.

* * * * *